United States Patent [19]
Park

[11] Patent Number: 6,118,508
[45] Date of Patent: Sep. 12, 2000

[54] LIQUID CRYSTAL DISPLAYS INCLUDING REFERENCE ELECTRODE LINES THAT EXTEND ACROSS MULTIPLE PIXELS

[75] Inventor: Woon-Yong Park, Kyungki-do, Rep. of Korea

[73] Assignee: Samsung Electronics Co., Ltd., Rep. of Korea

[21] Appl. No.: 09/133,152

[22] Filed: Aug. 12, 1998

[30] Foreign Application Priority Data

Aug. 13, 1997 [KR] Rep. of Korea ............... 97-38648

[51] Int. Cl.[7] ................... G02F 1/1343; G02F 1/13
[52] U.S. Cl. ........................... 349/141; 349/187
[58] Field of Search .................. 349/43, 141, 187

[56] References Cited

U.S. PATENT DOCUMENTS

| | | | |
|---|---|---|---|
| 3,774,989 | 11/1973 | Takahashi | 349/141 |
| 4,345,249 | 8/1982 | Togashi | 340/784 |
| 5,113,181 | 5/1992 | Inoue et al. | 340/783 |
| 5,598,285 | 1/1997 | Kondo et al. | 349/39 |
| 5,745,207 | 4/1998 | Asada et al. | 349/42 |
| 5,760,857 | 6/1998 | Yanagawa et al. | 349/43 |
| 5,852,485 | 12/1998 | Shimada et al. | 349/141 |
| 5,977,562 | 11/1999 | Hirakata et al. | 349/141 |

FOREIGN PATENT DOCUMENTS 0-80475  3/1997  Japan .

*Primary Examiner*—Walter Malinowski
*Attorney, Agent, or Firm*—Myers Bigel Sibley & Sajovec

[57] ABSTRACT

LCD displays include a substrate, spaced apart data lines on the substrate, and spaced apart gate lines on the substrate that intersect the spaced apart data lines to define an array of display elements. A display electrode and a reference electrode are provided in each display element. The display electrode includes display electrode fingers. The reference electrode includes reference electrode fingers that are spaced apart from the display electrode fingers. A reference electrode line extends across multiple display elements parallel to the reference electrode fingers, and electrically connects the reference electrodes in multiple display elements. Preferably, the display electrode fingers and the reference electrode fingers are symmetrically arranged about the reference electrode line in a display element. More preferably, the reference electrode line extends across a display element at the center thereof.

18 Claims, 10 Drawing Sheets

LIQUID CRYSTAL DISPLAYS INCLUDING REFERENCE ELECTRODE LINES THAT EXTEND ACROSS MULTIPLE PIXELS

FIELD OF THE INVENTION

This invention relates to liquid crystal displays (LCDs) and methods of fabricating and repairing same.

BACKGROUND OF THE INVENTION

Liquid crystal displays (LCDs) are widely used flat panel display devices. As is well known to those having skill in the art, a liquid crystal display generally includes a pair of spaced apart substrates with liquid crystals therebetween. Arrays of spaced apart data lines and gate lines define an array of pixels. A thin film transistor (TFT) for each pixel is electrically connected to a data line, a gate line and a pixel electrode.

LCDs may be classified by the orientation of the liquid crystals between the spaced apart substrates. In a twisted nematic (TN) LCD, the long axes of liquid crystal molecules are aligned parallel to the surfaces of the substrates, and the liquid crystal molecules are twisted between the two substrates. In contrast, in an in-plane switching (IPS) ICD, the liquid crystal molecules are rearranged to be parallel to the substrate upon application of an electric field therebetween.

LCDs may also be classified based on the manufacturing method that is used to form the channel region of the thin film transistors. In an etch stop-type LCD, an insulation layer is formed on a channel region of an amorphous silicon layer. Thus, the etch stop LCD may have a stable current characteristic, but the number of masks that are used may be increased. In contrast, in an etch back-type LCD, an amorphous silicon layer and a doped amorphous silicon layer are successively deposited and etched. Thus, the manufacturing process may be simple, but the amorphous silicon layer may need to be thick to obtain a channel region having a predetermined thickness, since part of the amorphous silicon layer may be removed when etching the doped amorphous silicon layer.

A basic structure for an IPS mode LCD is described in U.S. Pat. 4,345,249 to Togashi. As described in Togashi in a matrix type of LCD, in which an individual switching element is provided for each of the display elements, the electrodes of each display element comprise a first comb-shaped electrode pattern to which a display signal voltage is applied through a switching element, and a second comb-shaped electrode which is held at a reference potential. The first and second comb-shaped patterns are mutually intermeshed and formed upon a single substrate of the LCD. Application of a display signal voltage causes an electric field to be produced in a direction substantially parallel to the substrate plane, to thereby act upon the liquid crystal, rather than in a direction normal to the substrate plane, as in the case of a conventional type of LCD panel. The comb-shaped patterns may include a plurality of fingers that may extend parallel to the data lines, or parallel to the gate lines.

Unfortunately, crosstalk may be produced in an IPS LCD, that may degrade the image quality of the LCD. Specifically, when the reference electrode fingers extend parallel to the data lines and are made of gate metal, crosstalk may occur because the reference electrode lines cross the data lines. The crosstalk may produce a variation of the data signals relative to the reference electrodes. Moreover, a gate line and a reference electrode line may become short circuited, since they are adjacent one another. These short circuits may be difficult to repair. Alternatively, when the reference electrode fingers extend parallel to the gate lines and are made of data metal, crosstalk may occur because the gate lines and the reference electrode lines cross each other. Moreover, a data line and a reference electrode line may become short circuited because these lines are adjacent one another. These short circuits may be difficult to repair.

SUMMARY OF THE INVENTION

It is therefore an object of the present invention to provide improved LCD structures and methods of manufacturing and repairing same.

It is another object of the invention to provide LCD structures and manufacturing methods that can reduce crosstalk.

It is yet another object of the present invention to provide LCD structures and manufacturing methods that can allow repair of short circuits.

These and other objects are provided, according to the present invention, by providing reference electrode lines that extend across a plurality of display elements in an LCD display, parallel to the reference electrode fingers and electrically connecting the reference electrodes in the plurality of display elements. More specifically, LCD displays according to the invention include a substrate, a plurality of spaced apart data lines on the substrate, and a plurality of spaced apart gate lines on the substrate that intersect the plurality of spaced apart data lines to define an array of display elements. A display electrode and a reference electrode are provided in each display element. The display electrode comprises a plurality of display electrode fingers. The reference electrode comprises a plurality of reference electrode fingers that are spaced apart from the plurality of display electrode fingers. A reference electrode line extends across a plurality of display elements parallel to the reference electrode fingers, and electrically connects the reference electrode in a plurality of display elements.

Accordingly, the reference electrode lines need not cross the data lines and the distance between the reference electrode lines and the data lines can be increased. Therefore, the likelihood of crosstalk and interference between these lines may be reduced. Moreover, the distances between the display electrodes and the reference electrodes may be made equal because the reference electrodes and the display electrodes may be formed from the same metal layer. Therefore, increased display uniformity may be obtained.

Preferably, the display electrode fingers and the reference electrode fingers are symmetrically arranged about the reference electrode line in a display element. More preferably, the reference electrode line extends across a display element at the center thereof.

In a preferred embodiment, each display element comprises a reference electrode line extending across the display element at the center thereof. A pair of first display electrode fingers is also provided, a respective one of which extends parallel to the reference electrode line on a respective opposite side of the reference electrode line. A pair of first reference electrode fingers are also provided that extend parallel to the reference electrode line, a respective one of which is spaced apart from a respective one of the pair of first display electrode fingers, opposite the reference electrode line. A pair of second display electrode fingers extend parallel to the pair of first display electrode fingers. A respective one of the second display electrode fingers is spaced apart from a respective one of the first reference electrode fingers, opposite a respective first display electrode finger. A plurality of thin film transistors is also provided, a respective one of which is connected to a data line, a gate line and a display electrode.

Preferably, the LCD includes a first conductive layer and a second conductive layer that is electrically insulated from the first conductive layer. The display electrodes and the reference electrodes comprise first and second patterned portions respectively of the first conductive layer. The reference electrode lines comprise a first patterned portion of the second conductive layer. The gate line preferably comprises a third patterned portion of the first conductive layer.

According to another aspect of the present invention, a plurality of storage electrodes may also be provided for the LCD. The plurality of storage electrodes are connected to the plurality of reference electrode lines, a respective one of which extends adjacent a respective display electrode. When a first and second conductive layer are used as described above, the reference electrode lines and the storage electrodes may comprise first and second patterned portions respectively of the second conductive layer.

At least one insulating layer may be provided between the first conductive layer and the second conductive layer, including contact holes through which the reference electrode lines contact the reference electrodes. In an alternative embodiment, a patterned insulating layer is provided between the first conductive layer and the second conductive layer. The patterned insulating layer comprises first portions between the gate lines and the data lines and the reference electrode lines at intersections thereof. The patterned insulating layer also includes second portions between the display electrodes and the reference electrode lines at intersections thereof. The reference electrodes and the reference electrode lines are free of the patterned insulating layer at intersections thereof, so that they can contact each other without the need for separate contact holes.

Methods of manufacturing LCDs according to the invention include the step of forming on the substrate a first patterned conductive layer that defines a plurality of spaced apart gate lines, an array of comb-shaped display electrodes and a corresponding array of comb-shaped reference electrodes. At least one thin film transistor layer is formed on the first patterned conductive layer. A second patterned conductive layer is formed on the at least one thin film transistor layer. The second patterned conductive layer defines a plurality of alternating spaced apart data lines and reference electrode lines that intersect the plurality of spaced apart gate lines. Each of the reference lines is connected to at least one of the reference electrodes.

In a first embodiment, the at least one thin film transistor layer is formed by forming a first insulating film on the first patterned conductive layer, forming an active layer on the first insulating film, and forming a second insulating film on the active layer. The second and first insulating films are patterned to form an etch stop layer on the active layer and to form contact holes that expose the display electrodes and the reference electrodes. A doped amorphous silicon layer is formed on the active layer. Following the step of forming a patterned second conductive layer, the doped amorphous silicon layer is etched using the patterned second conductive layer as a mask.

In an alternative embodiment of forming at least one thin film transistor layer according to the invention, an active layer is formed on the first insulating film and a doped amorphous silicon layer is formed on the active layer. The active layer and the doped amorphous silicon layer are then patterned. After the patterned second conductive layer is formed, the doped amorphous silicon layer is etched using the patterned second conductive layer as a mask.

LCDs may be repaired, according to the present invention, by forming at least one break in a reference electrode line that electrically contacts a gate line at an intersection thereof, adjacent the intersection thereof, to electrically isolate the reference electrode line from the gate line. More specifically, first and second breaks are formed in a reference electrode line that electrically contacts the gate line at an intersection thereof adjacent the intersection thereof and on opposite sides thereof, to electrically isolate the reference electrode line from the gate line.

Prior to forming the first and second breaks, a short circuit in the LCD is identified where a reference electrode line electrically contacts a gate line at an intersection thereof. Short circuited portions may be detected because the defects can be cross-shaped on the LCD. Repairing the defect can be performed by cutting the short circuited portion of the reference electrode. Accordingly, improved methods of repairing LCDs are provided.

DETAILED DESCRIPTION OF PREFERRED EMBODIMENTS

Figure 1:
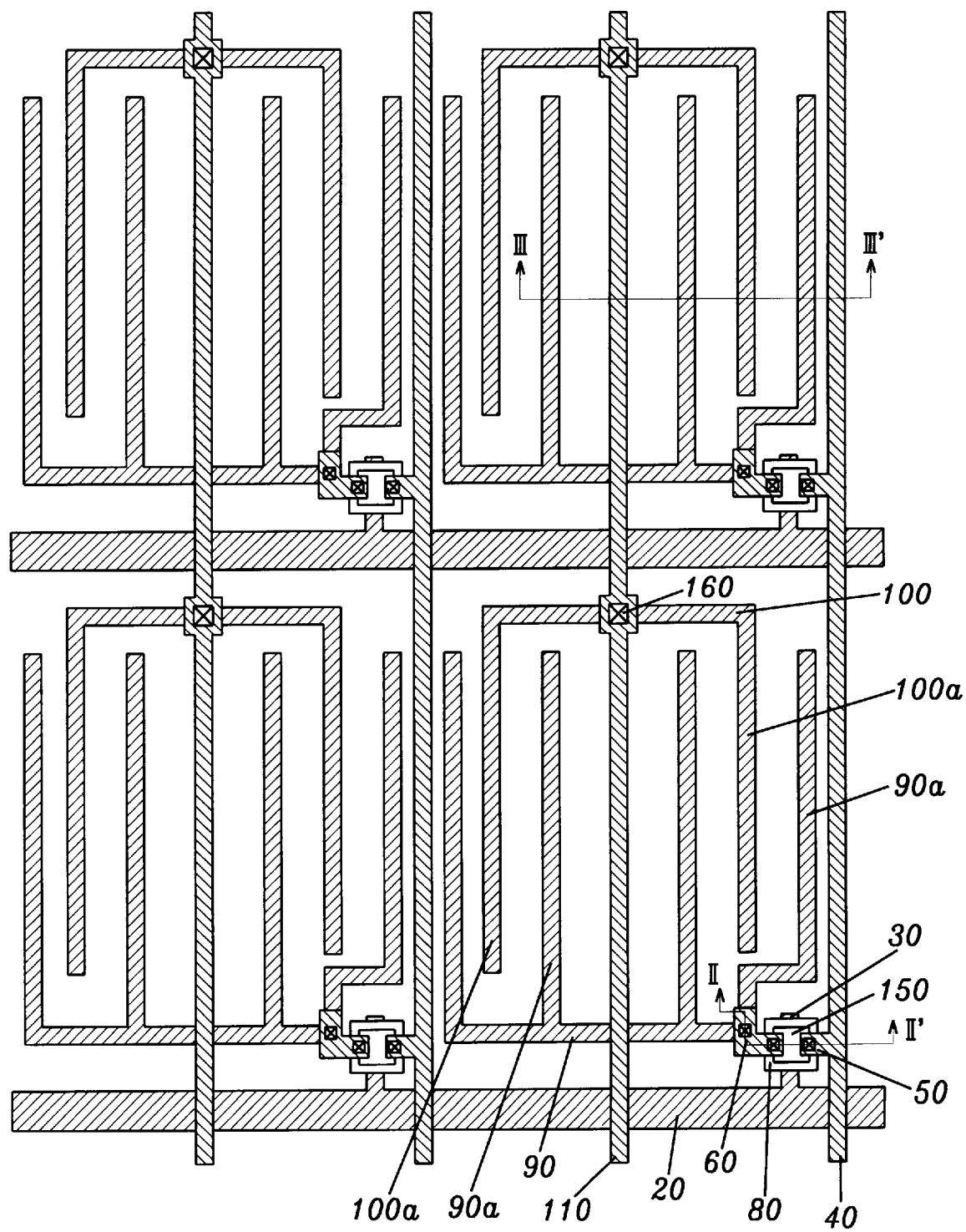
FIG. 1 is a layout view of a thin film transistor substrate of a thin film transistor liquid crystal display (LCD) according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervenino elements present.

Liquid crystal displays (LCDs) according to the present invention include a first thin film transistor (TFT) substrate, a second color filter substrate and a liquid crystal material between the TFT substrate and the color filter substrate.

Figure 2:
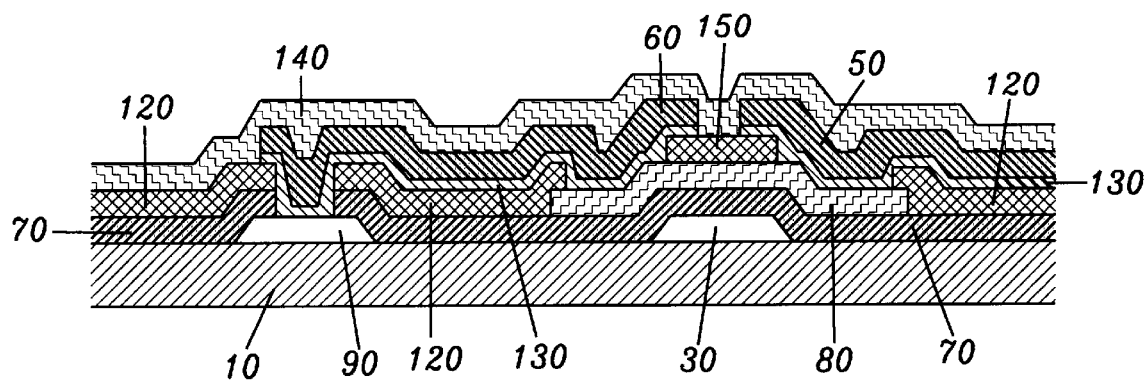
FIG. 2 is a cross-sectional view taken along the line II–II' in FIG. 1.

FIG. 1 is a layout view of a TFT substrate of a TFT-LCD according to a first embodiment of the present invention. FIG. 2 is a cross-sectional view taken along the line II–II' in FIG. 1, and FIG. 3 is a cross-sectional view taken along the line III–III' in FIG. 1.

Figure 3:
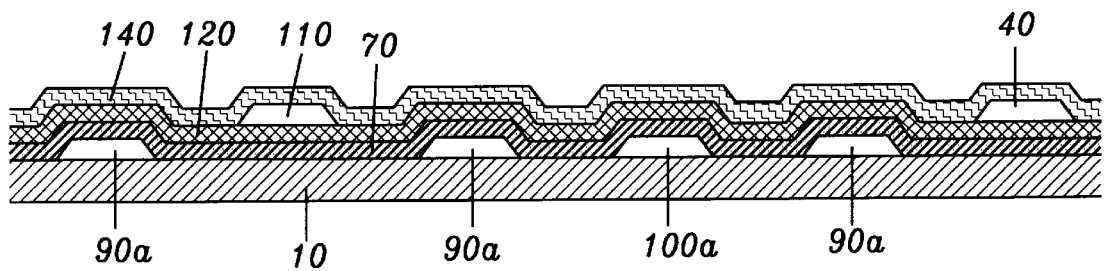
FIG. 3 is a cross-sectional view taken along the line III–III' in FIG. 1.

As shown in FIG. 1 to FIG. 3, a plurality of spaced apart gate lines 20 are arranged horizontally and a plurality of spaced apart data lines 40 crossing (intersecting) the gate lines 20 are arranged vertically on a transparent substrate 10. However, these directions may be reversed. A TFT, which includes a gate electrode 30, a source electrode 50, a drain electrode 60, a first insulating film 70, an amorphous silicon layer 80, a doped amorphous silicon layer 130, and an etch stop layer 150, is formed near the intersection of a gate line 20 and a data line 40. The source electrode 50 is a part of the data line 40, the gate electrode 30 is a part of the gate line 20, and the first insulating film 70 is a gate insulating film. The gate line 20 and the data line 40 are insulated from each other by the first insulating film 70.

Comb-shaped display electrodes 90 and comb-shaped reference electrodes 100, include a plurality of display electrode fingers 90a and a plurality of reference electrode fingers 100a that extend parallel to the data lines 40, and are formed in each display element (pixel) defined by the gate lines 20 and the data lines 40. A display electrode 90 is connected to the drain electrode 60 so that the data signals from the data line 40 are transmitted to the display electrodes 90 via the TFT. Furthermore, the display electrodes 90 and the reference electrodes 100 are formed of the same layer and made of the same material, and they are covered with the first insulating film 70. A second insulating film 120 is formed on the first insulating film 70.

Reference electrode lines 110, which are formed of the same layer as the data lines 40, are formed on the second insulating film 120. Each reference electrode line 110 extends parallel to the data lines 40 and passes through the center of each display element. The reference electrode lines 110 are connected to the reference electrodes 100 through contact holes 160 in the first insulating film 70 and the second insulating film 120, and the reference electrode lines 110 are placed between the display electrode fingers 90a such that they serve as reference electrodes. Since the display electrode fingers 90a and the reference electrode fingers 100a are parallel to the data lines 40, the electric field generated by the two electrodes 90 and 100 is perpendicular to the data lines 40 and liquid crystal molecules are rearranged by this electric field.

Amorphous silicon layers and doped amorphous silicon layers are deposited on portions of the first insulating film 70 which are located on the intersection of the gate lines 20 and the data lines 40, on the intersection of the reference electrode lines 110 and the gate lines 20 and on the intersection of the reference electrode lines 110 and the display lines 90 in order to prevent short circuits between the conductive patterns 40, 20 and 110. The amorphous silicon layers and doped amorphous silicon layers can function as insulating layers.

Figure 4:
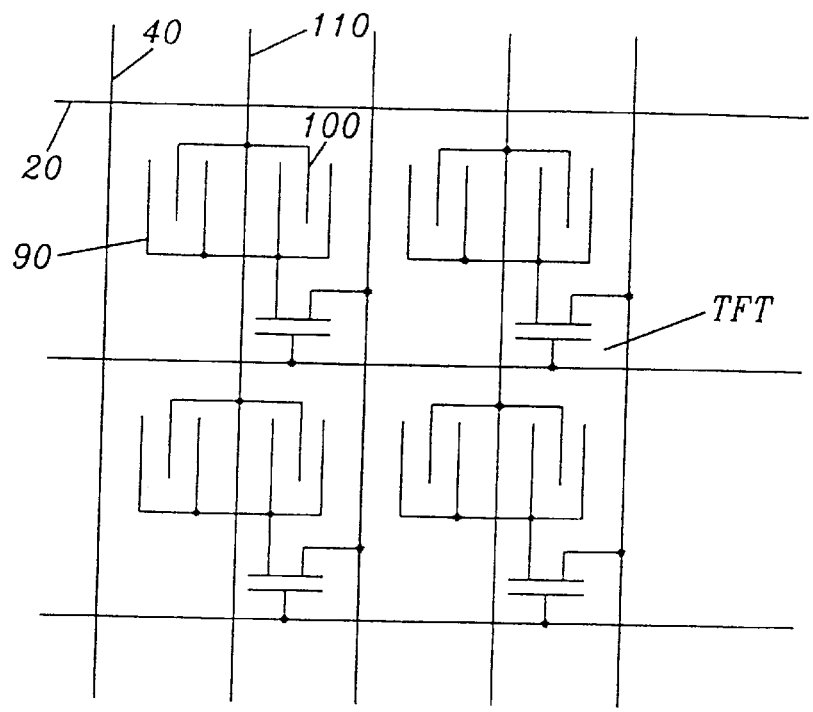
FIG. 4 is an equivalent circuit diagram of the thin film transistor substrate shown in FIG. 1.

FIG. 4 shows an equivalent circuit diagram of the thin film transistor substrate shown in FIG. 1. The reference electrodes 100 and the display electrodes 90 are provided in each display element. The reference electrode lines 110, which connect the reference electrodes 100, are parallel to the data lines 40, pass through the center of the display elements, and function as reference electrodes.

Figure 6:
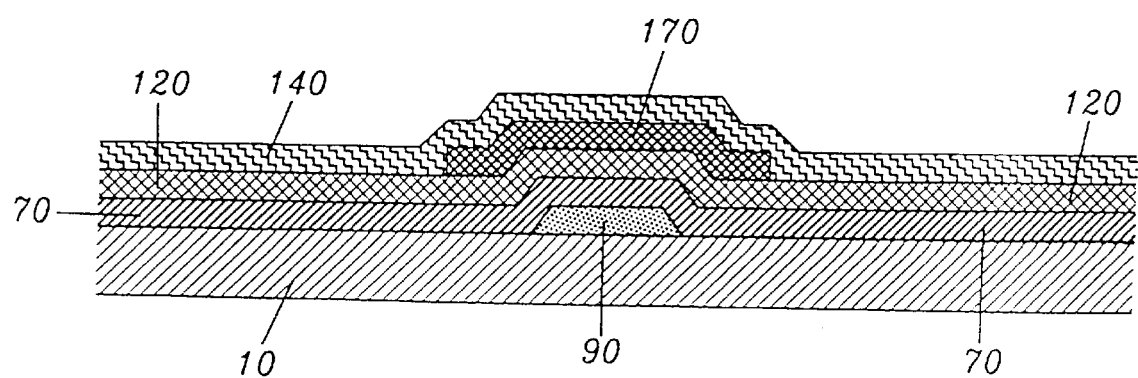
FIG. 6 is a cross-sectional view taken along the line VI–VI' in FIG. 5.
Figure 5:
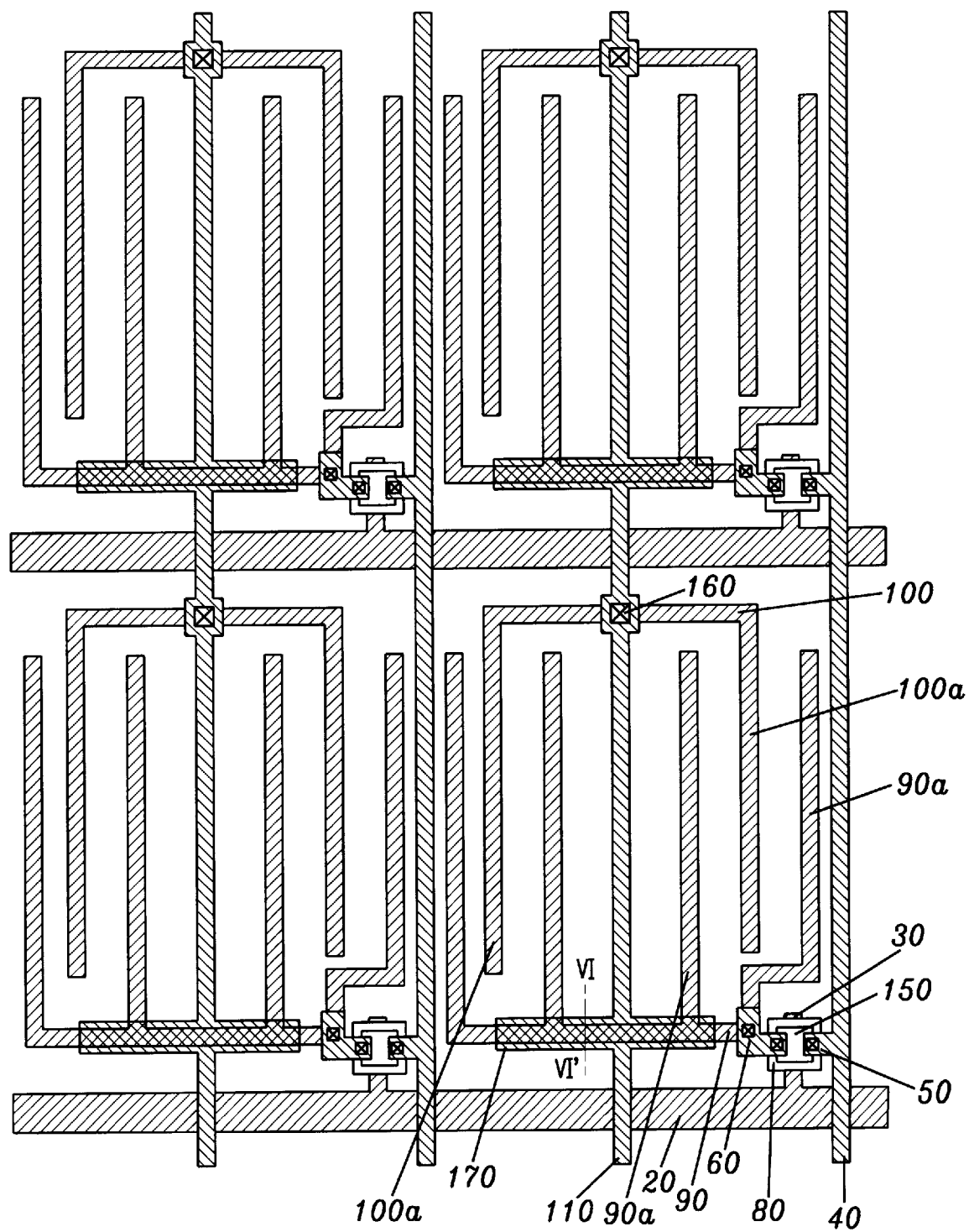
FIG. 5 is a layout view of a thin film transistor substrate having electrodes for storage capacitors according to the present invention.

Electrodes for storage capacitors may be formed in the TFT substrate in FIG. 1 so that display signals can be maintained for longer times. FIG. 5 shows a layout view of the thin film transistor substrate having electrodes for the storage capacitors, and FIG. 6 shows a cross-sectional view taken along the line VI–VI' in FIG. 5. The electrodes for storage capacitor 170 overlap the display electrodes 90, and extend from portions of the reference electrode lines 110 which are located at the intersections of the reference electrode lines 110 and the display electrodes 90. Thus, display signals in display electrodes 90 can be maintained for longer times.

Next, manufacturing methods of TFT-LCDs according to the first embodiment are described in detail. Generally TFTs may be classified into an etch-stopper type and an etch-back type. An etch-stopper type TFT is shown in FIG. 1 to FIG. 6, and the structure of the etch-back type TFT is similar to that of the etch-stopper type TFT except for an etch-stopper layer. Accordingly, with reference to FIGS. 7A to 7E and FIGS. 8A to 8D, manufacturing methods of TFT-LCDs are described.

First, manufacturing methods of TFT substrates with an etch-stopper layer is described with reference to FIG. 1 and FIG. 7A to FIG. 7F.

Figure 7A:
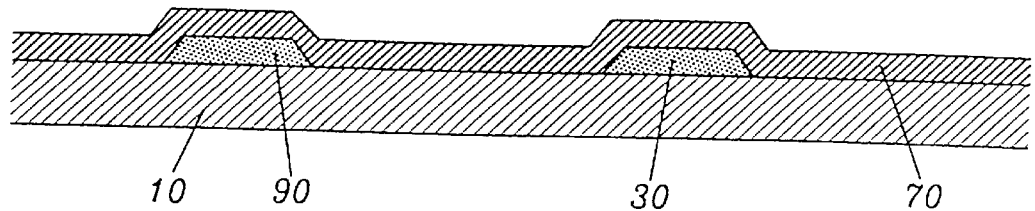
FIG. 7A to FIG. 7E show a manufacturing method of an etch-stopper type TFT according to the first embodiment.

As shown in FIG. 1 and FIG. 7A, a first conductive layer such as single layer made of aluminum (Al), aluminum-neodymium alloy (AlNd) or molybdenum (Mo), or multiple layers including these single layers is formed on a transparent insulating substrate 10. The thickness of the first conductive layer is about 1,500 Å to about 3,000 Å. The first conductive layer is patterned to form a gate electrode 30, display electrodes 90, gate lines 20 and reference electrodes 100. A first insulating film 70 having thickness of about 3,000 Å to about 4,000 Å and comprising silicon nitride is deposited thereon.

Figure 7B:
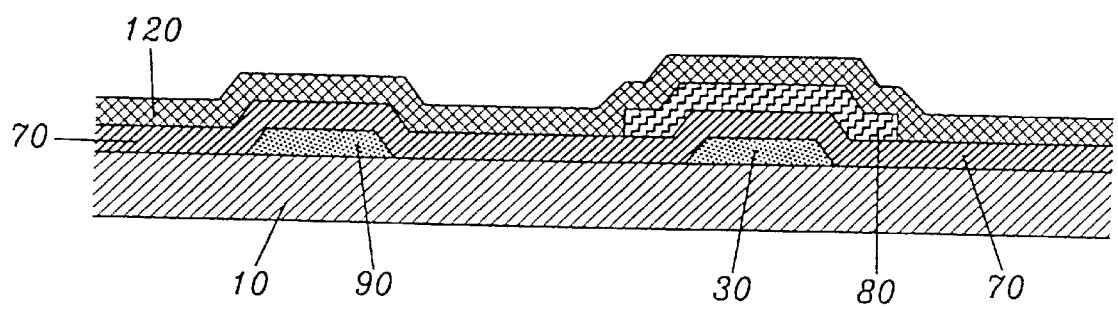

An amorphous silicon layer 80 of thickness of about 500 Å to about 3,000 Å, which is made of amorphous silicon and serves as an active layer, is deposited on the first insulating film 70 and patterned, as shown in FIG. 1 and FIG. 7B. A second insulating film 120 with thickness of about 2,000 Å to about 3,000 Å is deposited on the first insulating film 70 and on the amorphous silicon layer 80. The second insulating film 120 comprises silicon nitride.

Figure 7C:
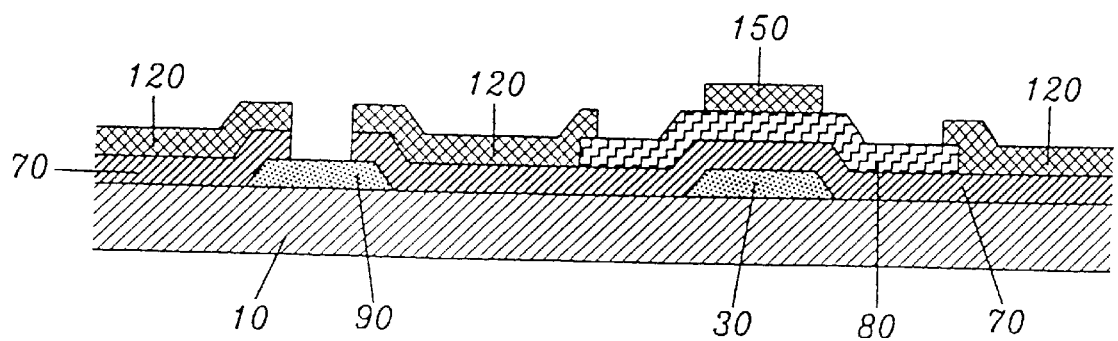

As shown in FIG. 1 and FIG. 7C, the first insulating film 70 and the second insulating film 120 are patterned to form an etch-stopper layer 150 on the amorphous silicon layer 80, and to form contact holes 160 exposing the display electrode 90 and the reference electrode 100.

Figure 7D:
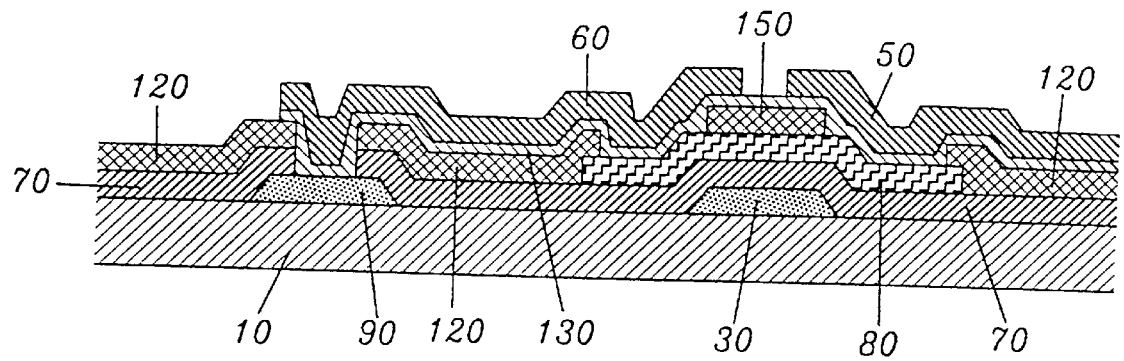

As shown in FIG. 1 and FIG. 7D, a doped amorphous silicon layer 130 with thickness of about 200 Å to about 500 Å, preferably 300 Å, is deposited thereon. A second conductive layer such as a metal layer with thickness of about 2,000 Å to about 4,000 Å, which is made of chromium (Cr), molybdenum (Mo) or chromium-molybdenum alloy (CrMo), is deposited on the doped amorphous silicon layer 130. The second conductive layer is patterned to form a drain electrode 60, a source electrode 50, a data line 40 and reference electrode lines 110. The drain electrode 60 is connected to the display electrode 90, and the reference electrode line 110 is connected to the reference electrode 100 through the contact holes 160. An electrode for a storage capacitor 170 may also be formed by extending the reference electrode line 110 as shown in FIG. 5.

Figure 7E:
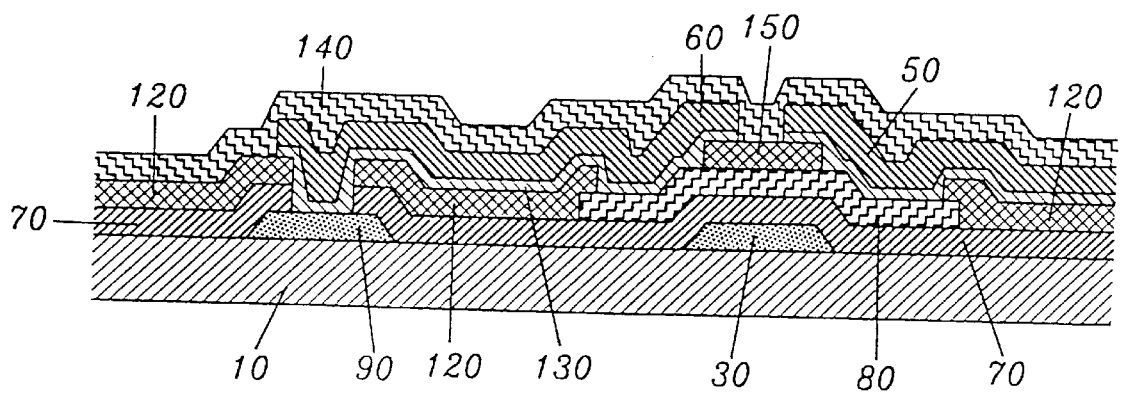

As shown in FIG. 1 and FIG. 7E, the exposed portions of the doped amorphous silicon layer 130 are etched. A silicon nitride layer of thickness of about 1,500 521 to about 2,500 Å is deposited and patterned to form a passivation layer 140.

A manufacturing method for etch-back type TFT substrates according to a first embodiment of the invention will now be described with reference to FIG. 1 and FIGS. 8A to 8D.

Figure 8A:
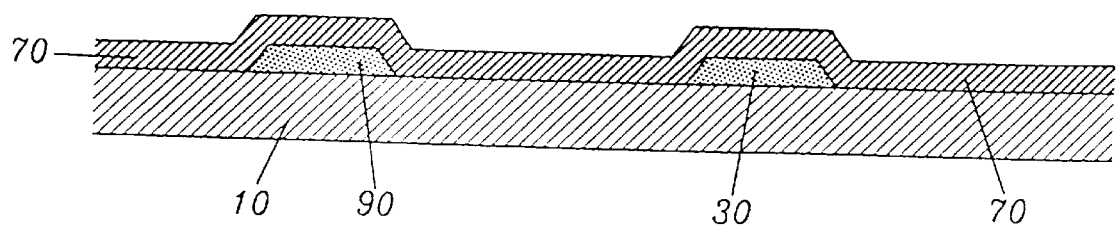
FIG. 8A to FIG. 8D show a manufacturing method of an etch-back type TFT according to the first embodiment.

As shown in FIG. 1 and FIG. 8A. a first conductive layer such as single layer made of aluminum (Al), aluminum-alloy or molybdenum (Mo), or multiple layers including these single layers is formed on a transparent insulating substrate 10. The thickness of the layer is about 1,500 Å to about 3,000 Å. The first conductive layer is patterned to form a gate electrode 30, display electrodes 90, gate lines 20 and reference electrodes 100. A first insulating film 70 having thickness of about 3,000 Å to about 4,000 Å and comprising silicon nitride is deposited thereon.

Figure 8B:
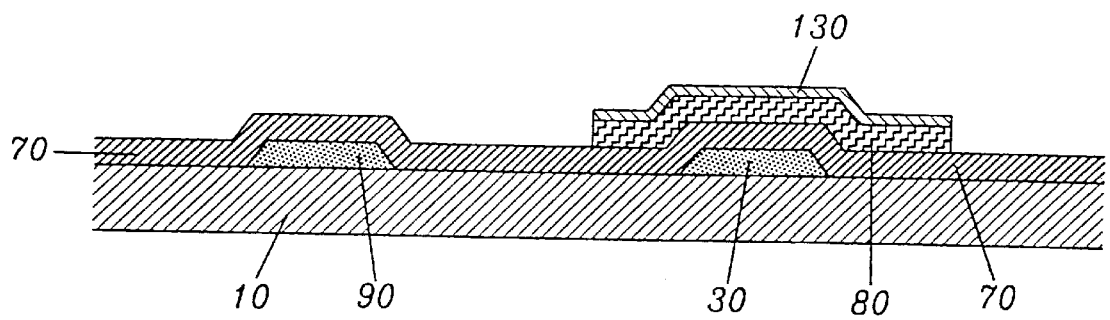

As shown in FIG. 1 and FIG. 8B, an amorphous silicon layer 80 of thickness of about 500 Å to about 3,000 Å and a doped amorphous silicon layer 130 of thickness of about 200 Å to about 500 Å are deposited on the gate insulating film 70 in sequence and patterned.

Figure 8C:
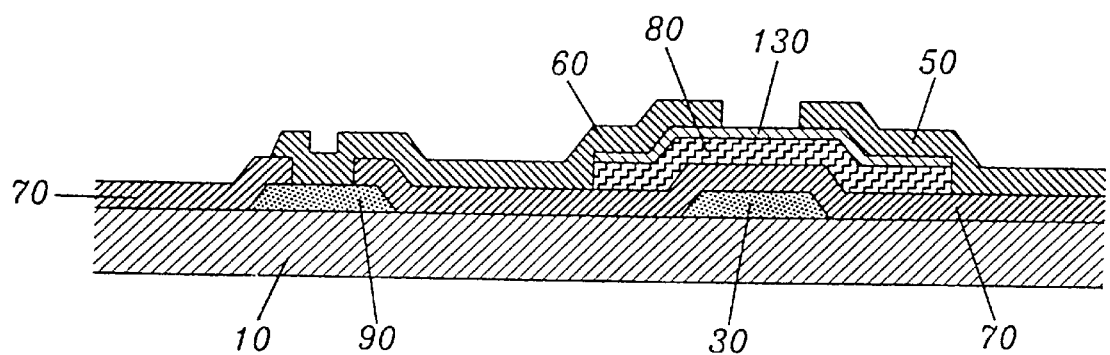

As shown in FIG. 1 and FIG. 8C, portions of the gate insulating film 70 on the reference electrode 100 are removed to form contact holes 160 exposing the reference electrodes 100. A second conductive layer such as a metal layer of thickness of about 2,000 Å to about 4,000 Å, which comprises Cr, Mo, or AlCr alloy, is deposited. The second conductive layer is patterned to form a source electrode 50, a drain electrode 60, a data line 40 and reference electrodes 110. The drain electrode 60 is connected to the display electrode 90, and the reference electrode line 110 is connected to the reference electrode 100 through contact holes 160. An electrode for a storage capacitor 170 may also be formed by extending the reference electrode line 110 as shown in FIG. 5.

Figure 8D:
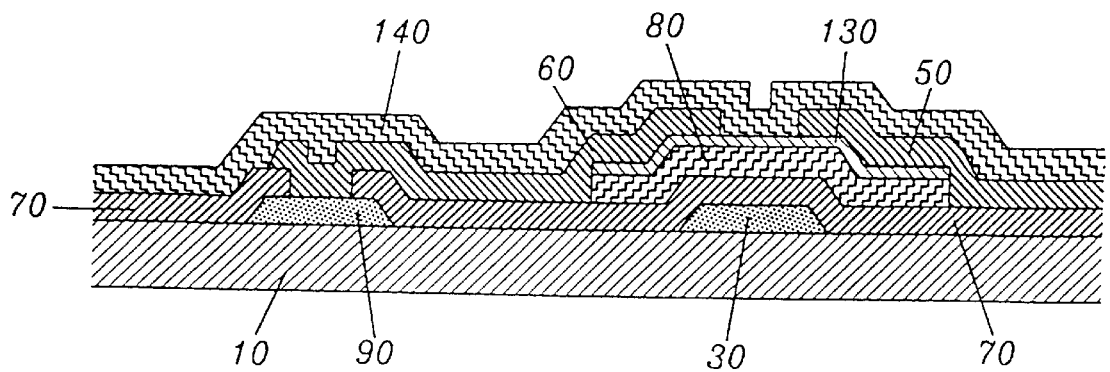

As shown in FIG. 1 and FIG. 8D, the exposed portions of the doped amorphous silicon layer 130 on the amorphous silicon layer 80 are etched. A silicon nitride layer of thickness of about 1,500 Å to about 2,500 Å is deposited and patterned to form a passivation layer 140.

Figure 9:
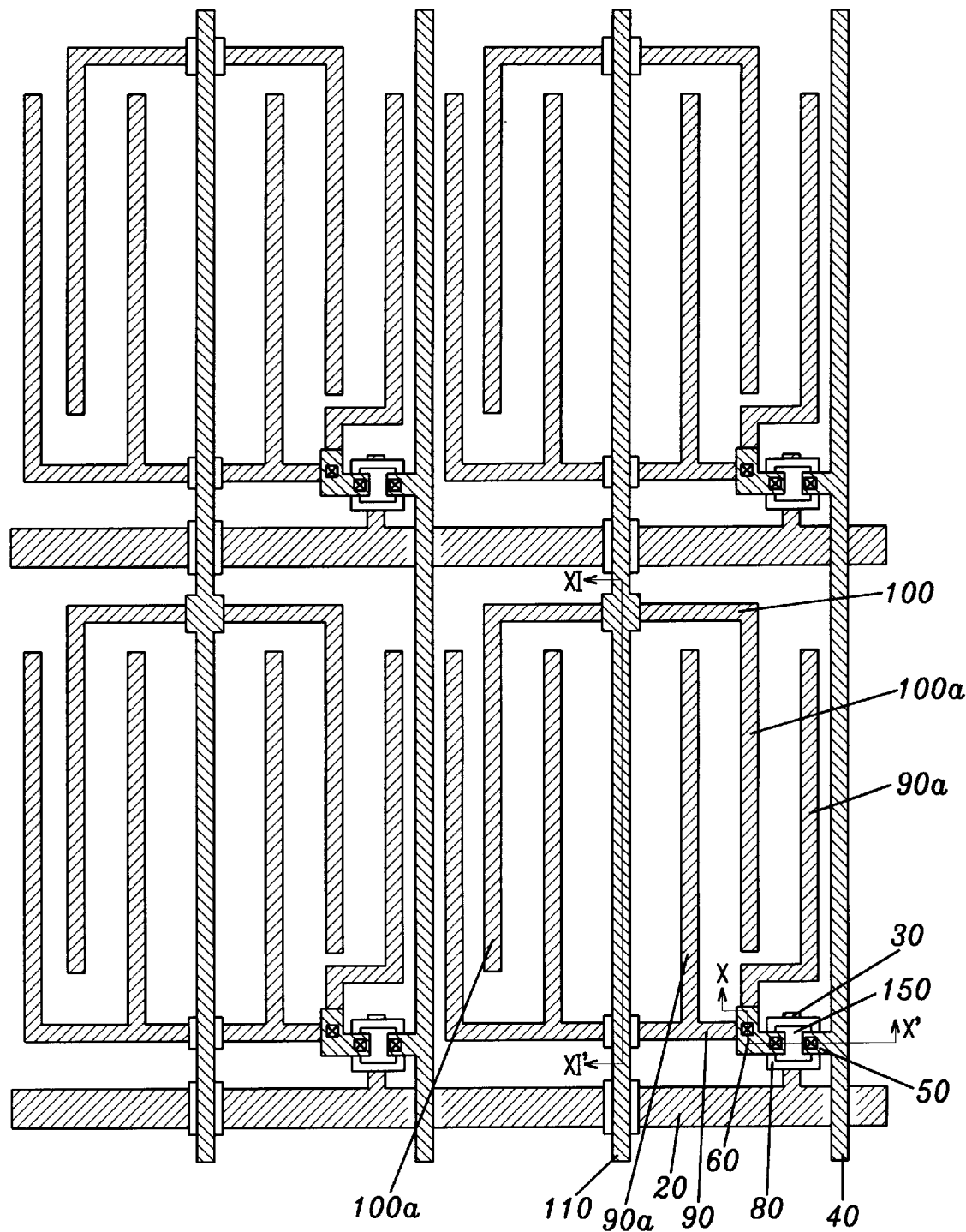
FIG. 9 is a layout view of a thin film transistor substrate according to a second embodiment of the present invention.
Figure 10:
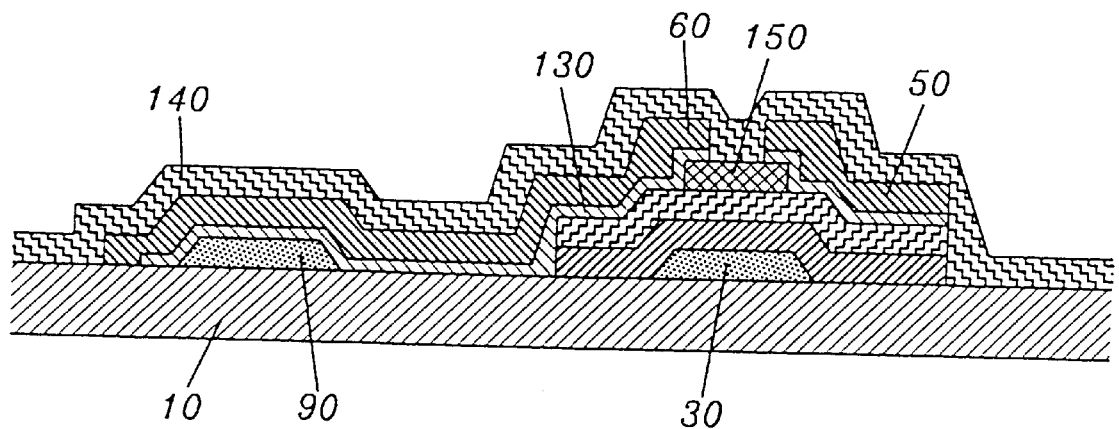
FIG. 10 is a cross-sectional view taken along the line X–X' in FIG. 9.

A second embodiment of the invention is described with reference to FIGS. 9 to 11. FIG. 9 is a layout view of a thin film transistor substrate according to the second embodiment. FIG. 10 is a cross-sectional view taken along the line X–X' in FIG. 9, and FIG. 11 is a cross-sectional view taken along the line XI–XI' in FIG. 9.

Figure 11:
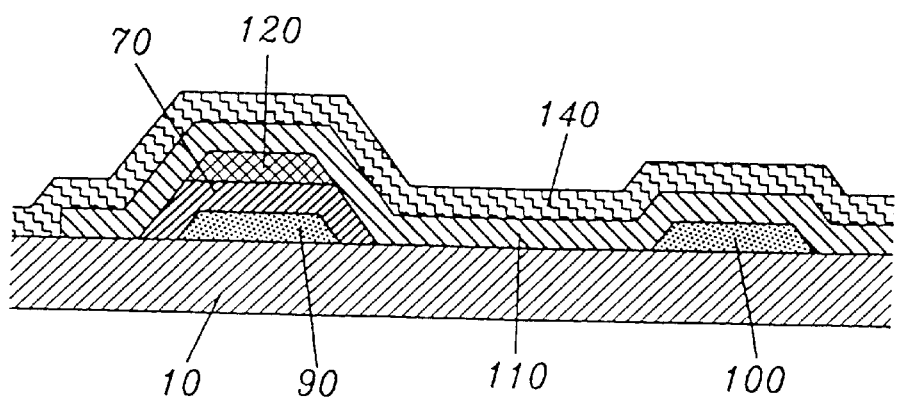
FIG. 11 is a cross-sectional view taken along the line XI–XI' in FIG. 9.

As shown in FIG. 9 to FIG. 11, a first insulating film 70 and a second insulating film 120 are formed only at the portions at which the display electrodes 90 and the gate lines 20 intersect the reference electrode lines 110, and at the intersecting portions of data lines 40 and the gate lines 20. The intersections of the reference electrodes 100 and the reference electrode lines 110 are free of the first insulating film 70 and the second insulating film 120. Reference electrode lines 110 and the data lines 40 comprise different metal from the display electrodes 90, reference electrodes 100 and the gate lines 20. The reference electrode lines 110 and the reference electrodes 100 contact each other directly.

Similar to the first embodiment, amorphous silicon layers and doped amorphous silicon layers may be deposited. The first and the second insulating films 70 and 90 may also be deposited at the portions at which the display electrodes 90 and the gate lines 20 intersect the reference electrode lines 110, and at which the data lines 40 intersect with the gate lines 20, to prevent short-circuiting between lines or electrodes.

It is possible to form electrodes for a storage capacitor by extending portions of the reference electrode lines 110. In this case, the electrodes for the storage capacitor are insulated from the display electrodes 90 by the first and the second insulating films 70 and 120.

Manufacturing methods of TFT substrates according to the second embodiment is similar to that of the first embodiment.

As described above, the reference electrode lines 110 and the data lines 60 do not cross each other. In addition, these lines 110 and 60 may be separated by a maximum distance and the gate line 20 may be separated from the reference electrode line 110. Therefore, defects due to short-circuits between the lines may be reduced.

Furthermore, the distances between the display electrodes 90 and the reference electrodes 100 may be made equal because the reference electrodes 100 and the display electrodes 90 are formed from the same layer with the same metal. Therefore, the display characteristics may be made uniform.

Figure 12:
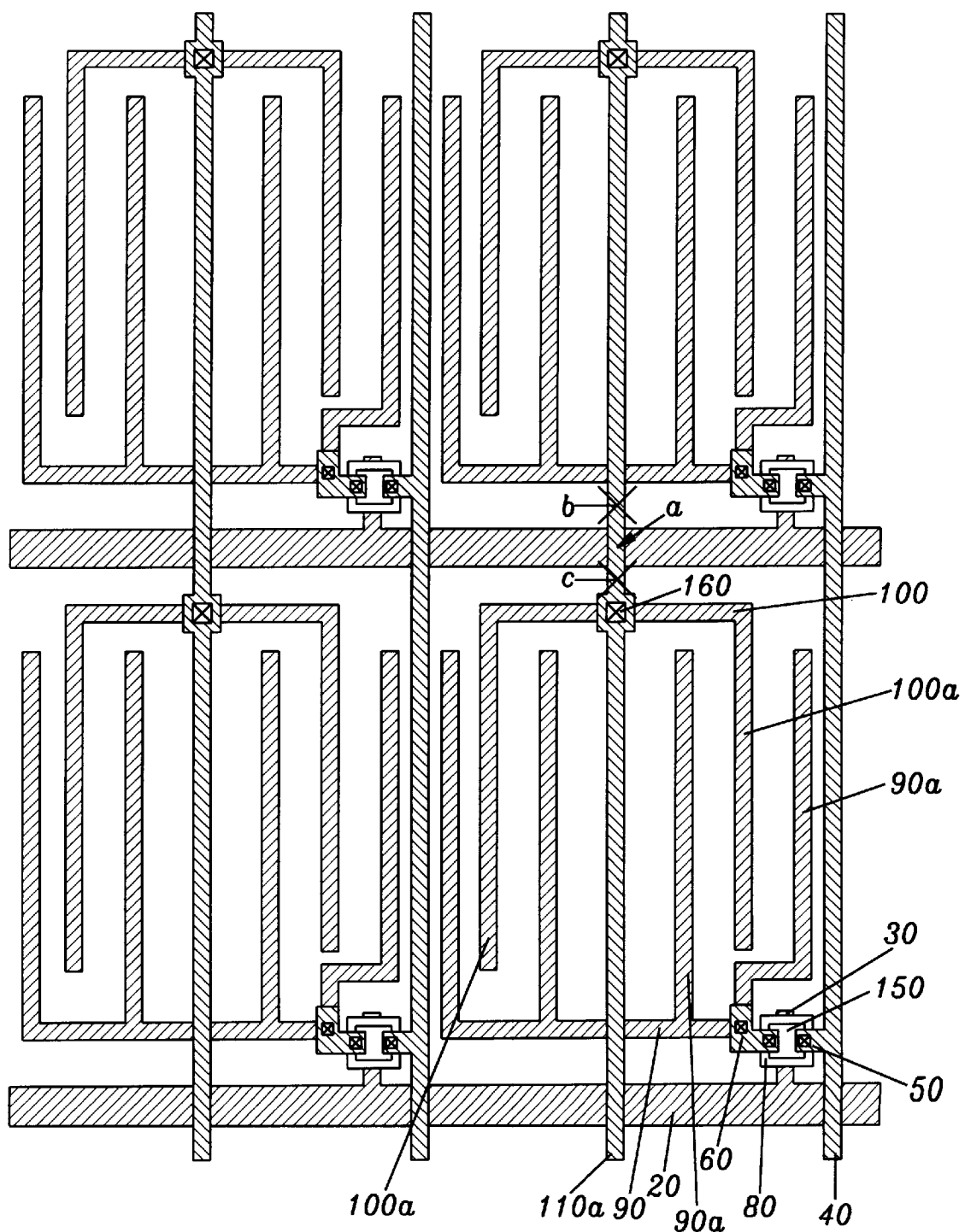
FIG. 12 is a layout view of a thin film transistor substrate illustrating repair methods according to the present invention.

Methods of repairing short circuits between a reference electrode line 110 and a gate line 20 according to the invention will now be described with reference to FIG. 12. These methods may be used with TFT substrates according to the first or the second embodiments.

The TFT substrate has a plurality of crossing (interacting) points between the reference electrode lines 110 and the gate lines 20, or the data lines 40 and the gate lines 20. As shown in FIG. 12, it is assumed that a reference electrode line 110a and a gate line 21 are short-circuited at a cross point a. The short-circuited point a may be detected since the pixel row and the pixel column respectively connected to the short-circuited gate line 21 and the short-circuited reference electrode line 110 form a cross in the display.

The defect due to the short-circuit may be repaired by cutting portions b and c of the reference electrode line 110 located on opposing sides of the short-circuited point a, to separate the short-circuited portion from the reference electrode line 110. Since the signals flow from both ends of the reference electrode line 110, it can be transmitted to every pixel. These repairing methods can be adapted to the second embodiment as well as the first embodiment.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display (LCD) comprising:

a substrate;

a plurality of spaced apart data lines on the substrate;

a plurality of spaced apart gate lines on the substrate that intersect the plurality of spaced apart data lines to define an array of display elements;

a display electrode and a reference electrode in each display element, the display electrode comprising a plurality of display electrode fingers and the reference electrode comprising a plurality of reference electrode fingers that are spaced apart from the plurality of display electrode fingers; and a reference electrode line that extends across a plurality of display elements parallel to the reference electrode fingers, and electrically connects the reference electrodes in a plurality of display elements;

wherein the display electrode fingers and the reference electrode fingers are symmetrically arranged about the reference electrode line in a display element.

2. An LCD according to claim 1 further comprising a plurality of thin film transistors, a respective one of which is connected to a data line, a gate line and a display electrode.

3. An LCD according to claim 1 wherein the reference electrodes and the display electrodes comprise a first conductive material.

4. An LCD according to claim 3 wherein the reference electrode lines and the data lines comprise a second conductive material.

5. A liquid crystal display (LCD) comprising:

a substrate;

a plurality of spaced apart data lines on the substrate;

a plurality of spaced apart gate lines on the substrate that intersect the plurality of spaced apart data lines to define an array of display elements;

a display electrode and a reference electrode in each display element the display electrode comprising a plurality of display electrode fingers and the reference electrode comprising a plurality of reference electrode fingers that are spaced apart from the plurality of display electrode fingers; and a reference electrode line that extends across a plurality of display elements parallel to the reference electrode fingers, and electrically connects the reference electrodes in a plurality of display elements;

wherein the reference electrode line extends across a display element at the center thereof.

6. A liquid crystal display (LCD) comprising:

a substrate;

a plurality of spaced apart data lines on the substrate;

a plurality of spaced apart gate lines on the substrate that intersect the plurality of spaced apart data lines to define an array of display elements;

a display electrode and a reference electrode in each display element, the display electrode comprising a plurality of display electrode fingers and the reference electrode comprising a plurality of reference electrode fingers that are spaced apart from the plurality of display electrode fingers; and a reference electrode line that extends across a plurality of display elements parallel to the reference electrode fingers, and electrically connects the reference electrodes in a plurality of display elements;

wherein each display element comprises:

a reference electrode line extending across the display element at the center thereof;

a pair of first display electrode fingers, a respective one of which extends parallel to the reference electrode line on a respective opposite side of the reference electrode line;

a pair of first reference electrode fingers that extend parallel to the reference electrode line, a respective one of which is spaced apart from a respective one of the pair of first display electrode fingers, opposite the reference electrode line; and a pair of second display electrode fingers that extend parallel to the pair of first display electrode fingers, a respective one of which is spaced apart from a respective one of the first reference electrode fingers, opposite a respective first display electrode finger.

7. A liquid crystal display (LCD) comprising:

a substrate;

a plurality of spaced apart data lines on the substrate;

a plurality of spaced apart gate lines on the substrate that intersect the plurality of spaced apart data lines to define an array of display elements;

a display electrode and a reference electrode in each display element the display electrode comprising a plurality of display electrode fingers and the reference electrode comprising a plurality of reference electrode fingers that are spaced apart from the plurality of display electrode fingers;

a reference electrode line that extends across a plurality of display elements parallel to the reference electrode fingers, and electrically connects the reference electrodes in a plurality of display elements; and a first conductive layers a second conductive layer and an insulating layer therebetween, wherein the display electrodes and the reference electrodes comprise first and second patterned portions respectively, of the first conductive layer, and wherein the reference electrode lines comprise a first patterned portion of the second conductive layer.

8. An LCD according to claim 7 wherein the gate lines comprises a third patterned portion of the first conductive layer.

9. An LCD according to claim 8 wherein the insulating layer comprises a patterned insulating layer between the first conductive layer and the second conductive layer, the patterned insulating layer comprising first portions between the gate lines and the data lines and the reference electrode lines at intersections thereof, and second portions between the display electrodes and the reference electrode lines at intersections thereof, the reference electrodes and the reference electrode lines being free of the patterned insulating layer at intersections thereof.

10. A liquid crystal display (LCD) comprising:

a substrate;

a plurality of spaced apart data lines on the substrate;

a plurality of spaced apart gate lines on the substrate that intersect the plurality of spaced apart data lines to define an array of display elements;

a display electrode and a reference electrode in each display element, the display electrode comprising a plurality of display electrode fingers and the reference electrode comprising a plurality of reference electrode fingers that are spaced apart from the plurality of display electrode fingers;

a reference electrode line that extends across a plurality of display elements parallel to the reference electrode finders, and electrically connects the reference electrodes in a plurality of display elements; and a plurality of storage electrodes that are connected to the plurality of reference lines, a respective one of which extends adjacent a respective display electrode.

11. An LCD according to claim 10 further comprising a first conductive layers a second conductive layer and an insulating layer therebetween, wherein the display electrodes and the reference electrodes comprise first and second patterned portions respectively, of the first conductive layer, and wherein the reference electrode lines and the storage electrodes comprise first and second patterned portions, respectively, of the second conductive layer.

12. A liquid crystal display (LCD) comprising:
a substrate;
a plurality of spaced apart data lines on the substrate;
a plurality of spaced apart gate lines on the substrate that intersect the plurality of spaced apart data lines to define an array of display elements;
a display electrode and a reference electrode in each display element, the display electrode comprising a plurality of display electrode fingers and the reference electrode comprising a plurality of reference electrode fingers that are spaced apart from the plurality of display electrode fingers; and
a reference electrode line that extends across a plurality of display elements parallel to the reference electrode fingers, and electrically connects the reference electrodes in a plurality of display elements;
wherein the display elements are free of reference electrode fingers adjacent the reference electrode lines.

13. A liquid crystal display (LCD) comprising:
a substrate;
a plurality of spaced apart data lines on the substrate;
a plurality of spaced apart gate lines on the substrate that intersect the plurality of spaced apart data lines to define an array of display elements;
a display electrode and a reference electrode in each display element, the display electrode comprising a plurality of display electrode fingers and the reference electrode comprising a plurality of reference electrode fingers that are spaced apart from the plurality of display electrode fingers; and
a reference electrode line that extends across a plurality of display elements parallel to the reference electrode fingers, and electrically connects the reference electrodes in a plurality of display elements;
wherein one of the reference electrode lines electrically contacts one of the gate lines at an intersection thereof, the one of the reference electrode lines including at least one break therein adjacent the intersection to electrically isolate the one of the gate lines from a portion of the one of the reference electrode lines.

14. An ICD according to claim 13 wherein the at least one break comprises first and second breaks in the one of the reference electrode lines, adjacent the intersection and on opposite sides thereof.

15. An LCD according to claim 13 wherein the at least one break is at least one cut in the one of the reference electrode lines.

16. A method of manufacturing a liquid crystal display (LCD) comprising the steps of:
forming on a substrate, a first patterned conductive layer that defines a plurality of spaced apart gate lines, an array of comb shaped display electrodes and a corresponding array of comb shaped reference electrodes;
forming at least one thin film transistor layer on the first patterned conductive layer; and
forming a second patterned conductive layer on the at least one thin film transistor layer, the second patterned conductive layer defining a plurality of alternating spaced apart data lines and reference electrode lines that intersect the plurality of spaced apart gate lines, and wherein each of the reference electrode lines is connected to at least one of the reference electrodes.

17. A method according to claim 16 wherein the step of forming at least one thin film transistor layer comprises the steps of:
forming a first insulating film on the first patterned conductive layer;
forming an active layer on the first insulating film;
forming a second insulating film on the active layer;
patterning the second and first insulating films to form an etch-stop layer on the active layer and to form contact holes that expose the display electrodes and the reference electrodes; and
forming a doped amorphous silicon layer on the active layer; and
wherein the step of forming a patterned second conductive layer is followed by the step of etching the doped amorphous silicon layer using the patterned second conductive layer as a mask.

18. A method according to claim 16 wherein the step of forming at least one thin film transistor layer comprises the steps of:
forming an active layer on the first insulating film;
forming a doped amorphous silicon layer on the active layer;
patterning the active layer and the doped amorphous silicon layer; and
wherein the step of forming a patterned second conductive layer is followed by the step of etching the doped amorphous silicon layer using the patterned second conductive layer as a mask.

* * * * *

UNITED STATES PATENT AND TRADEMARK OFFICE
CERTIFICATE OF CORRECTION

PATENT NO.     :  6,118,508
DATED          :  September 12, 2000
INVENTOR(S)    :  Woon-Yong Park It is certified that error appears in the above-identified patent and that said Letters Patent is hereby corrected as shown below:

At column 9, line 25, please delete "element" and substitute – element, – therefor.
At column 10, line 20, please delete "layers" and substitute – layer, -- therefor.
At column 10, line 61, please delete "layers" and substitute – layer, -- therefor.
At column 11, line 43, please delete "ICD" and substitute – LCD – therefor.

Signed and Sealed this

Seventeenth Day of April, 2001

Attest:

NICHOLAS P. GODICI

*Attesting Officer*      *Acting Director of the United States Patent and Trademark Office*